United States Patent [19]

Folda et al.

[11] Patent Number: 5,242,748
[45] Date of Patent: Sep. 7, 1993

[54] TOUGHENED THERMOSETTING STRUCTURAL MATERIALS

[75] Inventors: Thomas Folda, Neuleiningen, Fed. Rep. of Germany; Jack D. Boyd, Westminster, Calif.; Helmut Tesch, Birkenheide, Fed. Rep. of Germany; Thomas Weber, Ludwigshafen, Fed. Rep. of Germany; Hans G. Recker, Irvine, Calif.

[73] Assignee: BASF Aktiengesellschaft, Ludwigshafen, Fed. Rep. of Germany

[21] Appl. No.: 293,236

[22] Filed: Jan. 4, 1989

[51] Int. Cl.$^5$ ............... C08L 63/00; C08F 283/04; B32B 27/00
[52] U.S. Cl. ........................ 428/272; 523/468; 525/423
[58] Field of Search ............ 523/468; 525/423; 428/272

[56] References Cited

U.S. PATENT DOCUMENTS 4,487,894 12/1984 Lee .................................. 525/423
4,510,272 4/1985 Loszewski ......................... 523/400

FOREIGN PATENT DOCUMENTS 099338 7/1983 European Pat. Off. .

OTHER PUBLICATIONS

Database WPIL, Accession No. 83-737328 [33] Derwent Publications Ltd, London, GB.

Primary Examiner—Melvyn I. Marquis
Assistant Examiner—Karen A. Dean
Attorney, Agent, or Firm—William G. Conger

[57] ABSTRACT

The incorporation of 2 to 25 $\mu$m particles of a limited class of polyimides having appreciable nonaromatic character into heat curable epoxy resin systems significantly increases the toughness of such systems without loss of other desirable properties. These toughened epoxy resin systems are useful in preparing carbon fiber reinforced composites having compression strength after impact (CAI) of greater than 45 Ksi after a 1500 in-lb/in impact.

26 Claims, No Drawings

TOUGHENED THERMOSETTING STRUCTURAL MATERIALS

BACKGROUND OF THE INVENTION

1. Field of the Invention

The subject matter of the present invention concerns toughened, thermosetting structural materials. More particularly, the subject matter involves structural materials which exhibit superior toughness, or resistance to impact-induced damage. Such materials find uses in many applications, particularly the aerospace field, as matrix resins for fiber reinforced prepregs, the composites prepared therefrom, and as structural adhesives.

2. Description of the Related Art

Although many thermoplastics are tough, ductile materials, their use in structural materials has been minimal for several reasons. First, many of the thermoplastics do not have the required, solvent resistance, thermal stability, and high softening points required in demanding aerospace applications. Second, the high temperature engineering thermoplastics are difficult to process, often requiring both high temperature and pressure to produce acceptable fiber reinforced parts.

For these reasons, and despite the proliferation and improvement of high temperature, high performance thermoplastics, thermosetting systems currently remain the important commercial resin systems. Of the thermosets available, by far the most common are the epoxies, the bismaleimides, and the cyanates. Each of these resin systems has its own unique set of physical and chemical attributes, but all are glassy, generally crosslinked systems which tend to be brittle. Thus attempts at toughening such systems have become increasingly important.

By the term toughness is meant resistance to impact induced damage. Toughness in cured neat resin samples may be assessed by the critical stress intensity factor, $K_{1C}$, among others. Toughness in fiber reinforced composites prepared by laying up and subsequently curing numerous plies of prepregs is best assessed by measuring the compression strength after an impact of suitable energy. Generally, an impact of 1500 in-lb/in is used, and compression after impact (CAI) values measured in accordance with Boeing test BSS 7260 on a quasiisotropic $[+45/0/-45/90]_{4s}$ layup.

Elastomers have been used with good success in toughening a number of thermosetting resins, particularly epoxy resins. Examples of such systems are given in Bauer, *Epoxy Resin Chemistry II*, Chapters 1-5, ACS Symposium Series 221, American Chemical Society, Washington, D.C., 1983. Both soluble and infusible elastomers have been utilized, the former generally increasing flexibility at the expense of physical properties such as tensile modulus, while the latter generally increase toughness without substantially affecting bulk properties. Both types of modification generally lead to lower thermal properties, an effect which can be minimized when polysiloxane elastomers are utilized.

Soluble thermoplastics have also been used, for example in the article by Bucknall and Partridge, "Phase Separation in Epoxy Resins Containing Polyethersulfone," *Polymer* 24 639-646 (1983). In Bucknall's examples, dissolution of up to 17 percent by weight of a polyethersulfone having a molecular weight above 20,000 Daltons in an epoxy formulation increased toughness by up to 50 percent. At the highest levels, phase separation was noted upon cure of the system, the resulting cured neat resin consisting of the glassy polyethersulfone discontinuous phase dispersed within a glassy epoxy continuous phase. With epoxy resins having an average functionality of four, no phase separation was observed, although the cured system still displayed enhanced toughness.

Toughened systems have also been proposed which rely for toughness, on the use of oligomeric curing agents or monomers. Such monomers and curing agents have less crosslink density and thus are inherently more flexible, tougher systems. In U.S. Pat. No. 4,608,404, for example, epoxy resin systems containing an epoxy resin and an oligomeric amine-terminated polyethersulfone is disclosed. Such systems were capable of providing composites having CAI (compression after impact, see infra) values of greater than 30 Ksi, particularly when diaminodiphenylsulfone (DDS) was used as a co-curative.

In U.S. Pat. Nos. 4,656,207 and 4,656,208, the principles of Bucknall and Partridge and of the '404 patentees were logically combined to provide epoxy systems employing DDS and greater than 25 percent by weight of a reactive polyethersulfone oligomer having a molecular weight of from 2000 to 10,000 Daltons. These epoxy systems cure into two phase systems having a glassy discontinuous phase dispersed within a glassy continuous phase as disclosed by Bucknall but utilizing a lower molecular weight, and thus more soluble and less viscous, polyethersulfone oligomer. Carbon fiber reinforced composites employing the resin systems of the '207 and '208 patents are able to achieve CAI values in excess of 40 Ksi. Other researchers have utilized analogous technologies with bismaleimide resins.

In U.S. Pat. No. 4,604,319, discrete films of thermoplastic, optionally containing up to 40 percent by weight thermosetting resin, are applied under heat and pressure to epoxy or bismaleimide prepregs containing carbon fibers as reinforcement. When such film faced prepregs are laminated together to form a composite, CAI values greater than 40 Ksi can be obtained. Unfortunately, such prepregs have not been accepted by the industry due to the possibility of a mistake during layup wherein two thermoplastic films might abut each other, promoting catastrophic interlaminar separation. Furthermore, such prepregs have little tack, and thus make composite layup difficult.

In European patent EP-A-0 252 725, elastomeric interlayers are formed in situ by the filtering out of discrete, infusible particles by the fiber reinforcement because the particles are larger (10-75 $\mu$m) than the fiber interstices. Prepregs such as these and composites formed therefrom have the capability of having CAI values in the 40-50 Ksi range, but may suffer from lower properties at elevated temperatures.

In European patent EP-A-0 274 899, the addition of thermoplastics, preferably in the form of solid, spherical particles, to thermosettable resin systems is said to cause an increase in toughness. Examples of thermoplastics are polyamideimides, polybutyleneterephthalate, and nylon, with transparent nylons being preferred. When particles greater than 2 $\mu$m in diameter are utilized, the thermoplastic is concentrated in situ onto the outside of the prepreg as in EP-A-0 252 725. When particles having a size less than 2 $\mu$m are used, the thermoplastic remains homogenously dispersed within the prepreg.

SUMMARY OF THE INVENTION

It has now been found that the concept of toughening thermosetting resins by the addition of thermoplastics in particulate form is much too general, and that the addition of some thermoplastics even cause the toughness of the cured resin to be less than that of the unmodified resin. Thus as an initial consideration, it appears impossible to predict with any degree of accuracy, the behavior of broad classes of thermoplastics in a base resin system. However it has further been discovered that certain thermoplastics may be utilized to toughen resin systems effectively. These toughened resins may be used as structural adhesives but are most advantageously used as matrix resins in fiber reinforced heat curable prepregs.

DESCRIPTION OF THE PREFERRED EMBODIMENTS

The present invention concerns the addition of a select group of thermoplastic polyimides to epoxy resin systems in order to provide increased toughness, and, in particular, significant resistance to impact induced damage. The thermoplastic polyimides are added to the epoxy resin preferably by means of a slurry mixing process by means of which a substantial amount of polyimide remains in a particulate form having a mean size between 2 and 30 $\mu$m in the neat uncured matrix resin. During the prepregging operation, a substantial amount of these polyimide particles are filtered out by the reinforcing fibers, forming a thermoplastic rich and/or thermoplastic particle-rich zone substantially exterior to the fibers. Following cure, the polyimide may remain as a largely continuous film in the interlayer zone or a thermoplastic enriched epoxy layer.

The epoxy resins useful in the process of the subject invention are those which have an average functionality greater than about 1.8, preferably greater than 2.0. Such epoxy resins are well known to those skilled in the art, and numerous examples may be found in the *Handbook of Epoxy Resins*, Lee and Neville, McGraw-Hill, publishers; ©1967; *Epoxy Resins, Chemistry and Technology*, 2d Ed., Clayton May, Ed., Marcel Dekker, ©1988; and U.S. Pat. Nos. 4,608,404; 4,604,319; and 4,656,207, which are herein incorporated by reference. Particularly preferred are the epoxy resins which are the glycidyl derivatives of phenolated dicyclopentadiene and/or dicyclopentadiene oligomers, also known as DCPD epoxies, as taught by U.S. Pat. No. 3,536,734. Also preferred are the glycidyl ethers of the bisphenols such as bisphenol A, bisphenol F, bisphenol S and bisphenol K, and the glycidyl ethers of the cresol and phenol based novolacs. Further suitable are the glycidyl derivatives of amines and aminophenols, particularly p-aminophenol, aniline, phenylenediamine, and 4,4'-methylenedianiline.

The epoxy resins are not used alone, but are combined with suitable curing agents, catalysts, comonomers, rheology control agents, tackifiers, fillers, elastomeric toughening agents, reactive diluents, and other additives well known to those skilled in the art. By the term curing agent is mean a monomer or oligomer which is reactive with the epoxy group. Generally such curing agents have relatively low molecular weights, and reactive functionalities which are phenolic hydroxyl, primary or secondary amine, amide, or anhydride. Preferable curing agents are the monomeric and oligomeric amine functional polyarylenes wherein between the arylene groups are simple covalent bridges such as in the diaminodiphenyls, or connecting groups selected from the group consisting of alkylene of from 1–8 carbon atoms, ether, sulfone, ketone, carbonate, carboxylate, carboxamide and the like.

Particularly preferred are the polyarylenes wherein the connecting groups are alkylene, ether, sulfone, and ketone. Such polyarylenes and synthetic methods for preparing them may be found in U.S. Pat. Nos. 4,175,175 and 4,656,208 which are herein incorporated by reference. The molecular weights of the preferred curing agents is less than about 1000, preferably less than about 600, and most preferably less than about 450. Particularly preferred as curing agents are 3,3'-diaminodiphenylsulfone and 4,4'-diaminodiphenylsulfone, especially the latter. Mixtures of these curing agents may also be utilized. Aminohydrogen/epoxy group stoichiometry is preferably adjusted to a range between 0.6 and 1.6.

Phenolic hardeners include the simple bisphenols such as bisphenol A, bisphenol F, bisphenol S, and bisphenol K; the phenolated dicyclopentadiene oligomers whose preparation is taught by U.S. Pat. No. 3,536,734; and the phenolic hydroxyl functional phenol and cresol derived novolacs. Hardeners having three or more phenolic hydroxyls result in resins having higher crosslink density. Examples of such curing agents are, in addition to several of the novolac resins, 1,1,2,2-tetrakis[4-hydroxyphenyl]ethane, tetrahydroxybenzophenone, and tetrahydroxybiphenyl.

Also useful as curing agents are the amides such as sulfanilamide and very low molecular weight polyamide oligomers, and the anhydrides. Examples of such curing agents may be found in the references cited earlier.

Catalysts may sometimes be necessary when formulating epoxy resin systems. Such catalysts are well known to those skilled in the art. When amine functional curing agents are utilized, catalysis is generally optional, and catalysts such as tertiary amines and complexes of amines such as monoethylamine with borontrifluoride may be useful. However when phenolic functional curing agents or toughening oligomers are used, the epoxy-phenol reaction must be catalysed. Suitable catalysts are the phosphines, for example triphenylphosphine and hexyldiphenylphosphine, and the N-[3-phosphoranylidenyl-1-aza-cyclopenta-2,5-dione] radical-containing compounds prepared by the reaction of a triorganophosphine with a maleimide, for example the maleimides of p-aminophenol or 4,4'-methylenedianiline, generally in the presence of an inert solvent such as methylene chloride or N-methylpyrollidone as taught by copending U.S. patent application Ser. No. 07/100651.

Comonomers may be defined as relatively low molecular weight monomers or oligomers which, during cure of the subject invention epoxy resin systems, exhibit substantial reaction with themselves or with non-epoxy functional system components. Some reaction with epoxy functionality may also occur. Examples of such comonomers, which may be present in a minor amount, are unsaturated compounds such as the allylphthalates, styrene, and diallyl- and dipropenylbisphenols; the maleimides, for example the maleimides of 4,4'-methylenedianiline, toluenediamine, 2,2,4-trimethylhexandiamine and other amino functional intermediates including the amino terminated polyarylene oligomers described earlier; and the cyanate functional resins, for example those prepared by the reaction of a cyanogen halide with a bis- or higher functional phenol such as the bisphenols, and in particular, the phenolated dicyclopentadienes cited earlier. These cyanate comonomers may react with themselves to form triazine structures, or with epoxy groups to form oxazolinyl linkages.

Elastomeric toughening agents useful in the practice of the invention include the functionalized butadiene/acrylonitrile elastomers. Such elastomers may be hydroxyl, carboxyl, and amino functional, and are available commercially from the B. F. Goodrich Co., Akron, Ohio, under the tradename HYCAR ®. Also suitable are the functionalized polysiloxane elastomers such as those disclosed by J. S. Riffle et al in the article "Elastomeric Polysiloxane Modifiers for Epoxy Networks: Synthesis of Functional Oligomers and Network Formation Studies," *Epoxy Resin Chemistry II*, Bauer, Ed., ACS Symposium Series, American Chemical Society, Washington, D.C. Especially suitable are the secondary amine terminated polysiloxanes as taught in U.S. patent application Ser. No. 07/100514.

The elastomeric toughening agents may be added in such quantity and in such a manner as to homogenously modify the epoxy network. However, in such cases, the cured resin modulus and thermal stability is negatively affected. Tougher systems are prepared by adding the elastomer in the form of discrete particles, whether formed in situ by crosslinking with the epoxy matrix resin or by separate formation and incorporation into the resin system by traditional techniques such as three roll milling. The amount of elastomeric toughener may be varied over a wide range, for example from 0.5 to about 50 weight percent of the total resin system.

The thermoplastic polyimides useful in the subject invention must swell or be partially soluble in the other resin system components, at least during the cure cycle, but must also resist solution to such an extent that they may be thoroughly mixed into the resin while leaving a large portion, i.e. 20 weight percent, preferably 30 weight percent or more of added polyimide, as discrete particles.

Surprisingly, it has been found that not all thermoplastic polyimides perform equally in such applications. In order to possess the necessary attributes for epoxy resin toughening, the polyimide should be capable of at least partial solution or swelling in the epoxy resins used to prepare the resin system. However, polyimides which have solubilities so great that they dissolve completely during preparation of the resin are not suitable. A simple screening test for suitability is to add approximately 20 weight percent of the particular polyimide in the form of a powder having a mean particle size of between 2 $\mu$m and 25 $\mu$m to a liquid mixture of the epoxies, preferably at, room temperature or slightly above room temperature. If, after ten minutes or so of occasional agitation at the curing temperature of the catalysed resin the particles are not at least swollen by the epoxy solvent, then the polyimide is not suitable as the sole thermoplastic toughener in the epoxy resin system. If on the other hand, the polyimide is so rapidly soluble so as to completely dissolve in the epoxy when attempts at mixing are made, then such polyimides also are not suitable for use in the subject invention as the sole toughener.

In either of the above cases, the polyimide, while unsuitable for the toughening described herein, may yet be suitable for toughening by other methods, for example as a particulate additional phase in the cured resin, or as a dissolved toughener. In many cases, such methods of toughening are cumulative, and a combination of such methods, and also other methods such as the use of particulate elastomers, may result in even higher degrees of toughness.

Even within the class of thermoplastic polyimide tougheners described above which swell or partially dissolve in the matrix resin, certain polyimides exhibit particularly enhanced ability to toughen epoxy systems. These polyimides generally have less ordered structure than others by virtue of the asymmetry of their dianhydride and diamine comonomers. In particular, it has been found that these polyimides should have a molecular weight of about 20,000 preferably 30,000 Daltons or more, and have a repeating structure in which not more than 90 percent of the non-phthalimide carbons are in aromatic structures. By "phthalimide" carbons are meant the carbonyl carbon atoms which are present in the imide rings of the polyimides, and which are derived from the anhydride group carbons, whether these carbons are originally contained in aromatic anhydride groups or are derived from aliphatic dianhydrides. Each imide group obtained by the reaction of an anhydride group with a primary amine will thus contain two "phthalimide" carbon atoms. The term "non-phthalimide" carbons includes all carbons in the repeating units other than the "phthalimide" carbons.

The thermoplastic polyimides useful in the invention are prepared through the reaction of a dianhydride with a diamine. The reaction may occur neat, at temperatures above the melting points of at least one of the components, or in solution. Through careful manipulation of the molar quantities of dianhydride and diamine, the molecular weight of the resulting polyimide may be adjusted over a fairly wide range. The use of catalysts, for example pyridine, may be useful in facilitating the polyimide synthesis. Methods of synthesis of polyimides may be found in the Kirk-Othmer *Encyclopedia of Chemical Technology*, Vol. 18, Wiley-Interscience, pages 704-719.

Polyimides within the scope of the subject invention may be made, for example, by condensing an aromatic dianhydride such as pyromellitic dianhydride, 3,3'-bis[phthalyl]ether dianhydride, and benzophenone tetracarboxylic acid dianhydride (BTDA) with an aliphatic diamine such as 1,6-hexanediamine or 2,2,4-trimethylhexane-1,6-diamine; with an aromatic diamine containing significant aliphatic or cycloaliphatic structure such as 1,6-bis[4-aminophenyl]hexane or 5(6)-amino-1-(4'-aminophenyl)-1,3,3-trimethylindane (AATI).

Useful polyimides may also be prepared through the reaction of monomers wherein the dianhydride moiety contains aliphatic or cycloaliphatic carbon atoms, and the amino groups are attached to aromatic systems. Mixtures of such monomers may also be useful. Also useful are polyimides wherein all or part of either the dianhydride or diamine or both contain interspersed low molecular weight hetero groups such as oxide, sulfide, sulfone, and carbonate and the like. When such hetero groups are present, each atom in the group which directly bridges aromatic groups is counted as a carbon atom in making the calculations described above and exemplified below. Thus oxide and sulfide groups would be treated as if they were methylene groups, and carbonate groups as if they were propylene groups. Such polyimides have repeating units characterized by the structure

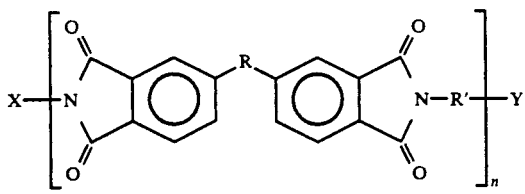

wherein X and Y are end groups which may be a residue of one of the reactive monomers such as

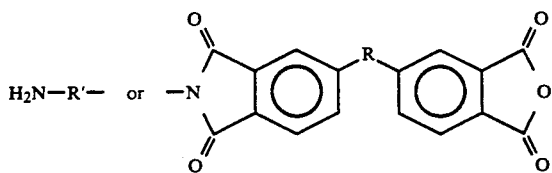

or may be a monofunctional capping agent which is reactive with amino or anhydride functionality; n is an integer such that the molecular weight of the polyimide is greater than about 20,000; and wherein R and $R^1$ are the non-anydride and non-amino monomer residues, respectively.

For example, the repeating unit of a polyimide based on 4,4'-methylenedianiline and benzophenone tetracarboxylic acid dianhydride (BTDA) contains 30 carbon atoms of which 26 are contained in other than phthalimide linkages, and 24 of which are contained in aryl systems. Thus the percentage of the non-phthalimide carbons which are aromatic is 24/26 or approximately 92 percent. Likewise, the polyimide prepared from toluenediamine and BTDA contains 90% of aromatic, non-phthalimide carbons. Such polyimides would not be expected to be useful in the practice of the subject invention.

Polyimides based on BTDA and AATI, however, contain but only approximately 81 percent aromatic, non-phthalimide carbons, and would be expected to be useful in the subject invention. Likewise, mixtures of AATI and MDA or TDA would be expected to work, so long as the aromatic, non-phthalimide carbon content is less than 90%. Other polyimides expected to be useful are those where the diamine is based in whole or in part on 2,2,4-trimethylhexane-1,6-diamine. Particularly preferred are those polyimides which, because of the asymmetry of the dianhydride or diamine, particularly the latter, possess a lesser degree of crystallinity. Polyimides based on BTDA and AATI are preferred. Such polyimides are available commercially under the trademark MATRIMID ® 5218 from the Ciba-Geigy Corporation, and have an inherent viscosity of >0.62 dl/g when measured at 0.5 weight percent concentration in N-methylpyrollidone at 25° C. The molecular weight of these most preferred polyimides is greater than 20,000 Daltons, preferably greater than 50,000 Daltons, and most preferably in the range of about 100,000 Daltons.

The resin system components of the subject invention, with the exception of the thermoplastic, are mixed and blended in the conventional manner. When mixtures of liquid epoxy resins and solid epoxy resins are utilized, the latter may be slurry mixed into the liquid epoxy in order that the final resin system display adequate tack and drape. The slurry mixing temperature is preferably less than 90° C., more preferably between 40° C. and 80° C. In such a process, the solid epoxy should preferably be in the form of particles, most preferably spherical or nearly spherical in shape, having a mean size of less than 10 μm, preferably less than 5 μm and most preferably less than 2 μm. Following formulation of the epoxy, the polyimide is added in the form of particles having a mean size of 2 μm or larger, preferably 5 μm or more, in order that during impregnation of fiber reinforced prepregs the polyimide particles remain substantially exterior to the fiber reinforcement.

Cure of composites prepared by laying up a number of plies of prepreg takes place according to conventional curing schedules, for example for several hours at temperatures from 150° C. to 200° C., preferably 170° C. to 180° C. The distribution of polyimide in the finished prepreg is not known with certainty. During cure the polyimide melts and may partially or wholly dissolve in the epoxy resin, but after curing is believed to form an interply layer of polyimide-rich material which is continuous or quasi-continuous in nature. In the best composites from such prepregs, this interply layer is undetectable by means of optical microscopy, but a gradient of increased thermoplastic concentration is still believed to exist. It is further believed that the presence of this layer is responsible for the extraordinary increase in toughness which results when polyimides meeting the requirements of the subject invention are utilized in the preparation of fiber reinforced prepregs by the film impregnation method as disclosed in U.S. Pat. No. 3,784,433. Unfortunately, the resin systems of the present invention are difficultly solution impregnable, but the use of solution impregnation followed by coating of an additional layer containing the polyimide, whether by traditional hot melt techniques, by printing techniques such as flexography, or by spraying such a film on the prepreg are available as prepreg production methods. An acceptable solvent for solution impregnation is acetone.

The amount of thermoplastic polyimide may vary within reasonable limits, i.e. up to about 40–50 weight percent of the epoxy resin system. However, the amount of polyimide must be in excess of about 15 weight percent, as at this low level, no improvement or even deterioration of composite properties may occur. Preferably between 15 and 40 weight percent, more preferably between 20 and 30 weight percent of the resin system comprises the polyimide.

A particularly preferred modification of the subject invention compositions further contains a completely soluble, reactive or non-reactive polyarylene polymer such as described previously under the description of curing agents but having a higher molecular weight, for example greater than 2000 Daltons. It has surprisingly been found that the addition of relatively minor quantities of such polyarylene oligomers, in particular polyethersulfones, may help prevent solubilization of the polyimide despite not being a chemically similar species. The amount of polyarylene polymer may range up to about 20 to 30 percent by weight of the total composition, but is effective in amounts of about 6 percent or less. Particularly preferred polyarylene polymers are those prepared from bisphenol A and a dihalodiphenylsulfone having amino or hydroxyl termini.

The toughened epoxy resin systems of the subject invention may be used as film adhesives or as matrix resins for the preparation of fiber reinforced prepregs, preferably the latter use. In their most preferred application the epoxy resin systems of the subject invention are used to impregnate carbon fibers for use in laying up carbon fiber reinforced composites. Such composites have extensive uses in the aerospace and transportation industries.

By the term "carbon fibers" are meant those fibers prepared by pyrolysing acrylonitrile fibers or carbon containing pitches to produce fibers whose content is virtually all carbon, regardless of its molecular structure. Such fibers in the past, have been designated as "graphite", "carbon/graphite", "C/G" or "carbon" fibers. All such fibers are generally now termed "carbon" fibers. Carbon fibers may be supplied in the form of bundles of unidirectional fibers, or tows, or woven into cloth. When supplied in the form of unidirectional tows, many of such tows are used to prepare planar, unidirectional prepregs by impregnation with a suitable matrix resin.

To impregnate the parallel tows of fibers or fabric of woven carbon fibers, the film impregnation method is generally used, as taught by U.S. Pat. No. 3,784,433. In this method, thin films of uncured matrix resin are prepared and supported temporarily by release papers or films. Such matrix resin films may be of a variety of thicknesses and weight per unit surface area, in order to prepare resin impregnated fibers having the appropriate resin content. This resin content may vary from about 20 to about 60 weight percent, but is preferably from 25 to about 45 weight percent, and most preferably from 30 to about 40 weight percent based on the total prepreg weight.

Following preparation of the neat resin films, the films are stripped of their support and fed along with the fiber substrate through a series of heated rollers or their equivalents, to melt and force the liquid resin into the fiber substrate. "Filming" as this technique is called, may be done from one side or from both sides of the fiber substrate by adjusting the weight of the film appropriately. In the practice of the subject invention, it is most desirable that dual filming be utilized, although good results have also been obtained using the single film technique.

Following their impregnation, the prepregs are supported on both sides by release paper or film and stored, generally at subambient temperature, for future use. In use, the prepregs are stripped of their release paper backing and numerous plies are stacked together. Following this stacking, or "layup", the assembly is generally "debulked" by applying vaccuum, following which the assembly is cured into a composite by curing at elevated temperature, generally under modest pressure.

Most desirably, the composite will exhibit high modulus, high tensile and compressive strength, resistance to impact-induced-damage, and excellent solvent resistance. Moreover, it is desirable that these properties be maintained under conditions of heat and cold, and high and low humidity. Ideally, the compressive strength of the composite after sever impact will not differ significantly from its preimpact value. In practice, however, these compression after impact (CAI) values are considerably less than the preimpact values. Thus, CAI values are of major importance in evaluating prepregs and their usefulness in preparing commercially viable composites. The prepregs of the subject invention are capable of routinely preparing composites having 1500 in-lb/in CAI values of greater than 40 Ksi with more preferred embodiments having CAI greater than 45 Ksi, both these values without tertiary (i.e. elastomeric particle) toughening which may result in further improvement.

The examples which follow serve to illustrate the practice of the subject invention, and should not be construed as limiting the scope of the invention in any way. All parts are by weight unless indicated to the contrary.

EXAMPLE 1 (Comparative)

An epoxy resin composition was prepared from 500 parts of the bisglycidyl ether of bisphenol F, 100 parts of DER ® 667, an epoxy resin available from the Dow Chemical Co., Midland, Michigan and 1500 parts of an epoxy resin derived from phenolated dicyclopentadiene as taught by U.S. Pat. No. 3,536,734 (DCPD epoxy) and having an epoxy functionality of approximately 2.2. The resins were heated to 270° F. (133° C.) and agitated until homogenous. After cooling to 160° F. (71° C.), 854 parts of 4,4'-diaminodiphenylsulfone curing agent and 6 parts of BF3·MEA catalyst were added and the resin stored for coating.

EXAMPLE 2 (Comparative)

The procedure of Example 1 was followed except that the resin composition contained 1500 parts DCPD epoxy, 300 parts of bisphenol F epoxy, 744 parts 4,4'-diaminodiphenylsulfone, and 4 parts BF3-MEA catalyst.

EXAMPLE 3

The procedure of Example 1 was followed but with 474 parts bisphenol F epoxy, 480 parts DCPD epoxy, and 444 parts -4,4'-diaminodiphenylsulfone. No catalyst was used. To the resin system at 160° F. (71° C.) was added 350 parts of MATRIMID ® 5218 which had been ground to an average particle size of 7–8 μm as determined by a laser particle size analyzer Mixing was continued for from 15–30 minutes wereupon a portion of the polyimide dissolved.

EXAMPLE 4 (Comparative)

Example 3 was followed, but PEEK ® 150 available from ICI, and having an average particle size of 8.5 μm was substituted for the MATRIMID ® 5218.

EXAMPLE 5

An epoxy resin mixture was prepared as in Example 3, but containing 395 parts bisphenol F. epoxy, 20 parts DER ® 667, 400 parts DCPD epoxy, and 347 parts 4,4'-diaminodiphenylsulfone. To this mixture was added 290 parts MATRIMID ® 5218 having an average particle size of 5.7 μm.

EXAMPLE 6 (Comparative)

Example 3 was followed using a resin containing parts DCPD epoxy, 412 parts bisphenol F epoxy, and 544 parts 4,4'-diaminodiphenylsulfone. Added to this resin was MATRIMID ® 5218 having an average particle size of 5.7μm in an amount of 200 parts.

EXAMPLE 7 (Comparative)

A resin formulation was prepared as in Example 3, using 500 parts of DCPD epoxy, 250 parts bisphenol F epoxy, and 330 parts 4,4'-diaminodiphenylsulfone. To this mixture was added, at 150° F. (66° C.), 270 parts of a polyimide prepared from BTDA, MDA, and TDA, having a non-phthalimide carbon content which contains between 90 and 92 percent aromatic carbons, and available commercially from Lenzing AG as polyimide P84. The polyimide did not appear to swell or dissolve.

EXAMPLE 8

An epoxy resin composition was prepared as in Example 3 containing 649 parts DCPD epoxy, 324 parts bisphenol F epoxy, 427 parts 4,4'-diaminodiphenylsulfone, and 350 parts MATRIMID ® 5218. The particle size distribution appeared to be at least bimodal, with some particles noticeably larger than others. The reason for the unusual particle size distribution was not known.

Prepreg and Composite Preparation

Films were prepared from each of the resins in the Examples and utilized to impregnate unidirectional IM-7 ® intermediate modulus carbon fiber available from Hercules, using the dual filming technique. Resin content was nominally 33 weight percent based on the weight of the finished prepregs. Following preparation of the prepregs, quasiisotropic laminates [+45,0,−45,90]$_{4s}$ were prepared and tested for compression after impact (CAI) and strain after impact (SAI), using Boeing test method BSS 7260. The results of the tests are presented below. CAI values presented were measured after an impact of 1500 in-lb/in.

TABLE I

| Example | Thermoplastic Type | Amount | CAI | SAI | Damage Area* |
|---|---|---|---|---|---|
| 1 (Comparative) | None | None | 36.7 | | 10.3 |
| 2 (Comparative) | None | None | 36.5 | 0.46 | 9.7 |
| 3 | Polyimide, <90% Aromatic | 20% | 48.3 | 0.75 | 5.3 |
| 4 (Comparative) | PEEK | 20% | 20.3 | — | 53.5 |
| 5 | polyimide, <90% Aromatic | 20% | 47.9 | — | 8.4 |
| 6 (Comparative) | polyimide, <90% Aromatic | 10% | 34.0 | — | 15.3 |
| 7 (Comparative) | polyimide, >90% Aromatic | 20% | ** | ** | 64.5 |
| 8 | polyimide, <90% Aromatic | 20% | 49.9 | 0.72 | 5.4 |

*Damage area in cm$^2$.
**Extreme delamination - could not be measured.

The table illustrates that when polyimide thermoplastics having greater than 90 percent aromatic carbons in the non-phthalimide portion of the repeating unit are used (Example 7) the composite properties are actually worse than the unmodified resin (Examples 1 and 2). In Example 7, delamination after impact was so severe that neither compression after impact nor strain after impact was capable of measurement. Table 1 also indicates that when less than about 15 weight percent of thermoplastic polyimide is added (Example 6), that the CAI values are about the same or even less than the unmodified resin, and the damage area is also somewhat greater. Table 1 further shows that when PEEK thermoplastic powders are utilized, the CAI value is much less than those of the unmodified resins and the damage area correspondingly greater.

The resin systems which correspond to the subject invention, however, which employ greater than about 15 percent of a thermoplastic polyimide having less than 90 percent of its non-phthalimide carbons in aryl units (Examples 3, 5, and 8) have toughness, as measured by CAI values, about 30 percent higher than unmodified resins. It must be emphasized, also, that this increase in toughness is achieved using a resin system which is already an exemplary system. The effect of the subject invention compositions when compared to more common epoxy resin systems having toughness (CAI) in the 21-26 Ksi range, should be even more dramatic.

Examples 9-14

To epoxy resin systems containing DCPD epoxy, bisphenol F. epoxy, and the trisglycidylether of p-aminophenol in proportions of approximately 1:1:1 and cured with DDS were added a hydroxyl terminated polysulfone having a molecular weight of approximately 6800 and identified in Table II below as PSU, and Matrimid 5218 in varying amounts. CAI results for each formulation were measured and reported in the table as well.

TABLE II

| Example | Thermoplastic | Amount, wt. % | CAI |
|---|---|---|---|
| 9 (comparative) | Matrimid 5218 | 6.5 | 36 |
| 10 (comparative) | Matrimid 5218 | 10.0 | 38 |
| 11 (comparative) | Matrimid 5218 | 15.0 | 39 |
| 12 (subj. inv.) | Matrimid 5218 | 20.0 | 48 |
| 13 (comparative) | PSU | 15.0 | 29 |
| 14 (subj. inv.) | PSU | 5.0 | |
| | Matrimid 5218 | 10.0 | 42 |

Examples 9-14, and Table II illustrate further that the amount of polyimide, when utilized alone, must be greater than 15 percent by weight to cause an increase in toughness. The change in toughness between 15 and 20 weight percent truly reflects a quantum leap in toughness. Table II also shows that less than 15 percent polyimide may be effective if, in addition, another partially soluble or swellable engineering thermoplastic such as a polyethersulfone or similar resin is substituted for the polyimide on at least a weight per weight basis, preferably from about 5 to about 20 percent by weight based on the total weight of the composition. Thus compositions containing in excess of about 10 percent of polyimide plus about 5 percent or more of a partially soluble or swellable polyarylene polymer such as a polysulfone, polyethersulfone, or the like are also suitable. Such polyarylenes preferably have molecular weights between 2,000 and 40,000 Daltons, more preferably between 5000 and 20,000 Daltons.

In addition to increasing toughness, the resin systems of the subject invention also display remarkable solvent resistance and hot/wet performance. For example, the resin system of Example 8 was exposed to various solvents for one week and retained the following interlaminar shear strengths ILS:

TABLE III

| Solvent | ILS (Ksi) |
|---|---|
| none, RT, dry | 17.0 |
| acetone | 16.5 |
| methylene chloride | 16.6 |
| methylethylketone | 17.0 |

The resin systems of the subject invention also show acceptable retention of properties under hot/wet test conditions. For instance, Example 5 of the subject invention has a hot/wet 0° compression strength of 182 Ksi at 180° F. wet while an epoxy system containing EXA 4032 epoxy (Shell Chemical Co.), 4,4'-diaminodiphenylsulfone, and nylon particles having an average size of 20 μm, Orgasol 1002) failed the hot/wet test, having a compression strength at 180° F. wet of only 108 Ksi.

The embodiments of the invention in which an exclusive privilege or property is claimed are defined as follows:

1. A method for increasing the toughness of a curable epoxy resin composition, comprising adding thereto from about 15 to about 50 weight percent based on the total composition, of a thermoplastic polyimide which is partially soluble or at least swellable in the epoxy resin, which is fusible at the resin composition curing temperature, and wherein a substantial amount of said polyimide remains in particulate form in the uncured resin system, wherein said resin composition when cured has increased toughness when compared to the same composition with said polyimide, wherein said thermoplastic polyimide has a molecular weight in excess of about 20,000 Daltons, and wherein less than 90 percent of the non-phthalimide carbon atoms are contained in aryl groups.

2. The method of claim 1 wherein said polyimide is the product of bis{phthalyl}ether dianhydride, bis{phthalyl}sulfone dianhydride, benzophenone tetracarboxylic acid dianhydride or pyromellitic dianhydride and one or more diamines selected from the group consisting of 5(6)-amino-1-(4'-aminophenyl)-1,3,3-trimethylindane; 2,2,4-trimethylhexane-1,6-diamine; 2,4'-, 3,3'-, 2,2'-, and 4,4'-methylenedianiline; 4,4'-diaminodiphenyloxide; 2,4- and 2,6-toluene diamine; and mixtures thereof.

3. The method of claim 1 wherein said resin composition contains an epoxy curing agent selected from the group consisting of 3,3'- and 4,4'-diaminodiphenylsulfone and their mixtures.

4. The method of claim 2 wherein said resin composition contains an epoxy curing agent selected from the group consisting of 3,3'- and 4,4,-diaminodiphenylsulfone and their mixtures.

5. The method of claim 1 wherein said polyimide has an average particle size prior to incorporation into the resin composition of from 2 to about 35 μm.

6. The method of claim 1 wherein said polyimide has an average particle size prior to incorporation into the resin composition of from about 2 to about 15 μm.

7. A curable epoxy resin composition, comprising:
   a. one or more epoxy resins having a functionality of about 1.8 or more;
   b. a curing agent selected from the group consisting of 3,3'- and 4,4'-diaminodiphenylsulfone and their mixtures; and
   c. from about 15 to about 50 weight percent based on the weight of the total composition of a thermoplastic polyimide which is partially soluble or at least swellable in the epoxy resin;
   wherein said composition, before curing, contains a substantial amount of polyimide in the form of discrete particles, wherein said composition after curing exhibits superior toughness as compared to an otherwise identical system not containing component c, wherein said thermoplastic polyimide has a molecular weight in excess of about 30,000 Daltons, and wherein less than 90 percent of the carbon atoms are contained in aryl groups.

8. The epoxy resin composition of claim 7 wherein one or more of said epoxy resins are selected from the group consisting of bisphenol A and bisphenol F epoxies and DCPD epoxies.

9. The composition of claim 7, further comprising
   d. a polyarylene polymer having a molecular weight of greater than about 2000 Daltons.

10. The composition of claim 9 wherein said polyimide is a polyimide based on benzophenone tetracarboxylic acid dianhydride and 5(6)-amino 1-(4'-aminophenyl)-1,3,3-trimethylindane, having a molecular weight greater than 20,000 Daltons and an inherent viscosity in excess of 0.62 dl/g when measured at 0.5 weight percent concentration in N-methylpyrrolidone at 25° C.

11. A matrix resin-impregnated, reinforcing fiber-containing prepreg wherein the matrix resin is the resin composition of claim 7.

12. A matrix resin-impregnated, reinforcing fiber-containing prepreg wherein the matrix resin is the resin composition of claim 9.

13. A matrix resin-impregnated, reinforcing fiber-containing prepreg wherein the matrix resin is the resin composition of claim 10.

14. The prepreg of claim 11 wherein said reinforcing fiber comprises carbon fibers.

15. The prepreg of claim 13 wherein said reinforcing fiber comprises carbon fibers.

16. The prepreg of claim 13 wherein said reinforcing fiber comprises carbon fibers.

17. The prepreg of claim 14 wherein said prepreg is capable of preparing a quasiisotropic composite having a CAI of greater than 45 Ksi when tested according to Boeing Test method BSS 7260.

18. The prepreg of claim 15 wherein said prepreg is capable of preparing a quasiisotropic composite having a CAI of greater than 45 Ksi when tested according to Boeing Test Method BSS 7260.

19. A curable epoxy resin composition, comprising:
   a. one or more epoxy resins having a functionality of about 1.8 or more;
   b. a curing agent selected from the group consisting of 3,3'- and 4,4'-diaminodiphenylsulfone and their mixtures;
   c. from about 10 to about 40 weight percent based on the weight of the total composition of a thermoplastic polyimide which is partially soluble or at least swellable in the epoxy resin; and
   d. from about 5 to about 20 weight percent based on the weight of the total composition of a polyarylene oligomer; and
   wherein said composition, before curing, contains a substantial amount of polyimide in the form of discrete particles, and wherein said composition after curing exhibits superior toughness as compared to an otherwise identical system not containing component c.

20. The composition of claim 19 wherein said polyarylene oligomer has a molecular weight of about 2000 to about 40,000 Daltons.

21. The composition of claim 19 wherein said polyarylene oligomer has a molecular weight of about 5000 to about 20,000 Daltons.

22. The composition of claim 21 wherein said polyarylene oligomer is an amino or hydroxyl terminated polyethersulfone.

23. The composition of claim 19 wherein component c is present in an amount in excess of 15 percent.

24. The prepreg of claim 11 wherein upon laying up into a composite structure containing multiple layers of said prepreg and following cure of said structure, no distinct interlaminar layer is observable by optical microscopy.

25. The prepreg of claim 12 wherein upon laying up into a composite structure containing multiple layers of said prepreg and following cure of said structure, no distinct interlaminar layer is observable by optical microscopy.

26. The prepreg of claim 13 wherein upon laying up into a composite structure containing multiple layers of said prepreg and following cure of said structure, no distinct interlaminar layer is observable by optical microscopy.

* * * * *